April 17, 1945. B. C. HASKIN 2,374,014
COLOR PHOTOGRAPHY
Filed April 28, 1942 2 Sheets-Sheet 1
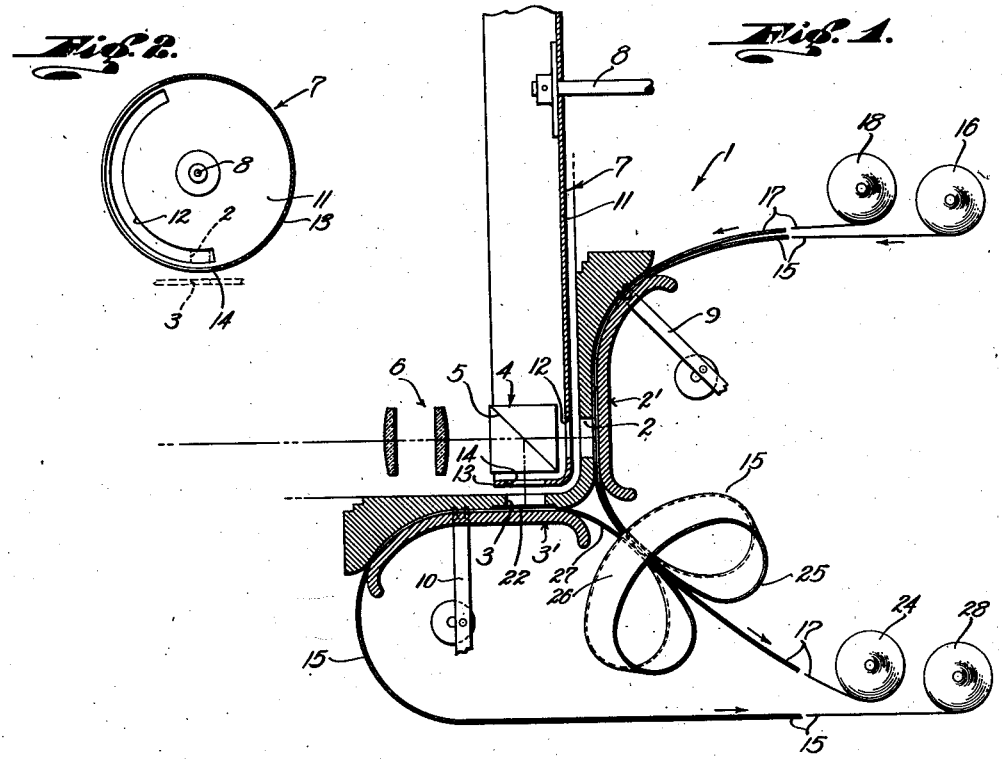
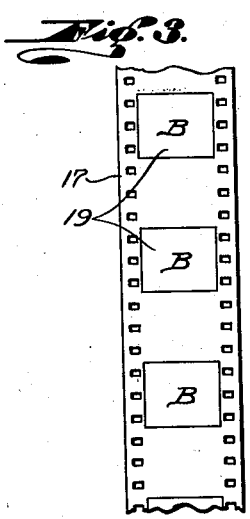
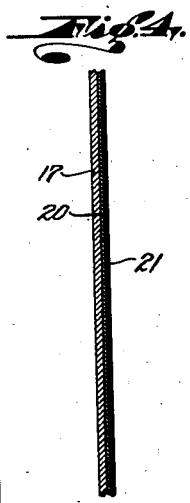
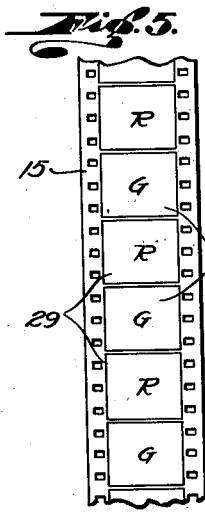
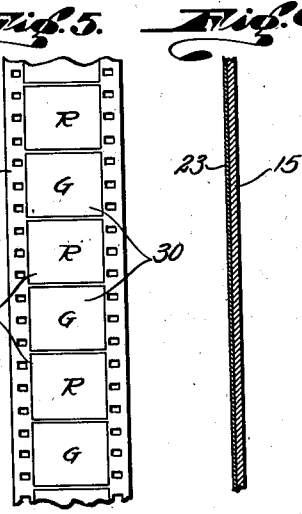
Inventor
BYRON C. HASKIN
Attorney April 17, 1945.　　　　B. C. HASKIN　　　　2,374,014
COLOR PHOTOGRAPHY
Filed April 28, 1942　　　　2 Sheets-Sheet 2

Inventor
BYRON C. HASKIN
Attorney

Patented Apr. 17, 1945

2,374,014

UNITED STATES PATENT OFFICE 2,374,014

COLOR PHOTOGRAPHY

Byron C. Haskin, Los Angeles, Calif., assignor to Warner Bros. Pictures, Inc., New York, N. Y., a corporation of Delaware Application April 28, 1942, Serial No. 440,797

2 Claims. (Cl. 95—2)

The invention relates to color photography and particularly to a three-color additive process for the photographic production of color separation negatives which may be employed to produce one or more positive prints having a transparent image of the object in natural colors.

It has heretofore been proposed to employ a subtractive process wherein a light beam is divided into two rays, one of which is received by a single film, and the other by a bi-pack, suitable filters being employed. The three films move through the camera one frame at a time, and each of them is exposed to provide color separation negatives. The three negatives thus produced are separately dyed colors complementary to the color of the light to which they were exposed, and the dyed images thus produced are transferred by imbibition to the positive film.

One object of the present invention is to avoid the necessity for three negatives, one for each of the three colors, and to reduce this number to two films, while nevertheless recording three colors.

This is accomplished by dividing the image rays into two beams as heretofore, by impinging one of these beams on a bi-pack having a filter between them, and by simultaneously subjecting one of the films in the bi-pack to the other beam. The film which is subjected to both beams is exposed in certain film areas in one beam and to other film areas in another beam, whereby three color records are formed on two films.

The invention makes it possible to transpose the color records thus formed into a positive print in natural color, without the use of imbibition. This is accomplished by printing a positive film from each of the three color sensation negatives, and by projecting light of the proper color and intensity through each of these negatives, the three lights in primary colors being combined into a single beam and employed to expose suitable positive stock such as Kodachrome. This allows more flexibility than is possible with imbibition, for the reason that if there is a discrepancy in the exposure intensity or color separation in the course of producing the negatives, this can be compensated for by suitably adjusting the intensity and color of the light projected through the positive films in the projection printing operation.

The camera disclosed herein is described and claimed in co-pending application Serial Number 473,426, filed January 23, 1943, for Color photography. The camera threading arrangement disclosed herein is described and claimed in copending application Serial Number 473,425, filed January 23, 1943, for Camera threading for color photography. The printer and printing method disclosed herein is described and claimed in co-pending application, Serial Number 473,427, filed January 23, 1943, for Printing for color photography.

For further details of the invention reference may be made to the drawings wherein Fig. 1 is a schematic vertical sectional view of a camera embodying the method of the present invention.

Fig. 2 is a vertical elevation, partly in section, of the shutter of Fig. 1.

Fig. 3 is a plan view of a portion of one of the exposed negative films having one of the color records thereon.

Fig. 4 is a longitudinal sectional view through the film of Fig. 3, illustrating in somewhat exaggerated form the dye on the emulsion of the film of Fig. 3.

Fig. 5 is a plan view of a portion of the other exposed negative film having two color records thereon in alternate frames.

Fig. 6 is a longitudinal sectional view of the film of Fig. 5.

Figure 8:
Figure 9:
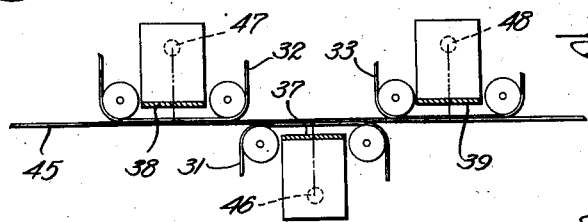

Figs. 8 and 9 schematically illustrate projection printers, for printing onto single coated or double coated stock, respectively.

Figure 10:
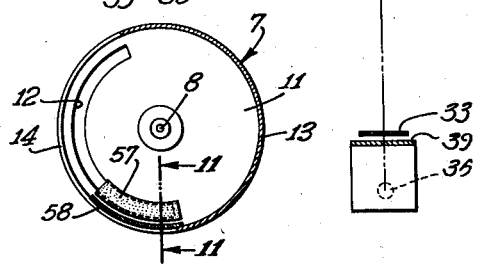

Fig. 10 is a vertical elevation, partly in section, and

Figure 11:
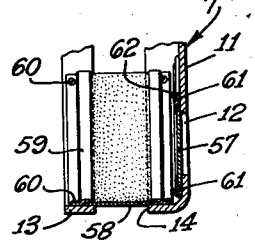

Fig. 11 is an enlarged sectional view on line 11—11 of Fig. 10, showing a modification of the shutter of Fig. 2.

Referring in detail to the drawings, the camera 1 is provided with two exposure apertures 2 and 3 in the film gates 2' and 3' arranged at right angles. In front of these gates is arranged a prism 4 having a partially reflecting surface 5. The prism 4 receives light rays in natural color from an objective lens 6. As is well-known, the light from the objective 6 is divided by the prism 4, the direct beam passing to the aperture 2, and the reflected beam to the aperture 3. Between the prism 4 and the apertures 2 and 3 is arranged a shutter 7 having a shaft 8 and suitable means not shown for rotating the shutter 7 in timed relation with the pull-down mechanisms 9 and 10. The radial portion or body 11 of the shutter 7 is provided with an arcuate aperture 12 to admit light at certain times to the aperture 2. The shutter 7 is provided with a peripheral rim 13 extending at right angles to the radial portion 11. The rim 13 is provided with an arcuate slot 14 having the same angular extent as slot 12, to admit the reflected beam to aperture 3 at the same time that the direct beam is admitted to aperture 2.

In threading the camera 1, preferably I employ a panchromatic film 15 supplied from a suitable reel 16, and an orthochromatic film 17 supplied from a suitable reel 18. The "ortho" film 17 is highly sensitive to blue and it is employed to record the blue record in alternate frames thereof as indicated at 19 in Fig. 2. Film 17 has an emulsion 20, the face of which is impregnated with a red dye as indicated at 21 in Fig. 3. Also, I preferably employ in the film gate 3' a green filter 22, with preferably no filter in the aperture 2. The films 15 and 17 are taken from the reels 16 and 18, respectively, and moved into bi-pack relation with their emulsions face-to-face as shown in Figs. 4 and 6 wherein the emulsion 23 of film 15 faces to the left, while emulsion 20 of film 17 faces to the right. The films 15 and 17 thus in bi-pack relation are threaded through the gate 2', the "ortho" film 17 after leaving this gate being fed through suitable sprocket means not shown, to a take-up reel 24. The film 15 after leaving gate 2' is turned away from film 17 as shown at 25 and looped over the side of both films 15 and 17 as shown at 26, so that the emulsion side of film 15 is at point 26 facing outwardly, the loop then being bent back on itself so that the emulsion side of film 15 faces film 17, with the portion 27 of film 15 extending in the opposite direction to the direction it was taking on leaving the gate 2'. The film 15 with its emulsion facing outwardly is now threaded through the gate 3' and after leaving this gate it is driven by a suitable sprocket and taken up on a suitable spool 28. The loop 25, 26 in the film 15 serves to position the film 15 first laterally, and then on the opposite side of film 17, so that the film 17 may be separated from the film 15 on leaving gate 2', while film 15 with its emulsion facing aperture 3 may be passed through gate 3'. The loop 25, 26 may be self-sustaining while the camera 1 is in operation, or guide rollers, not shown, may be provided.

The pull-down mechanisms 9 and 10 may be of any suitable type and they operate to simultaneously pull down the films 15 and 17 at aperture 2, and film 15 at aperture 3, two frames at a time, the films progressing counter-clockwise through the gates 2' and 3', while driven by sprockets not shown.

After exposure in the camera 1, the film 17 in alternate frames thereof, has a blue sensation record as indicated at 19. All of the even numbered frames of film 15 may be exposed at one of the apertures 2 or 3, and the remaining frames are exposed at the other aperture, resulting in alternate red and green sensation records as indicated at 29, 30 in Fig. 4.

Figure 7:
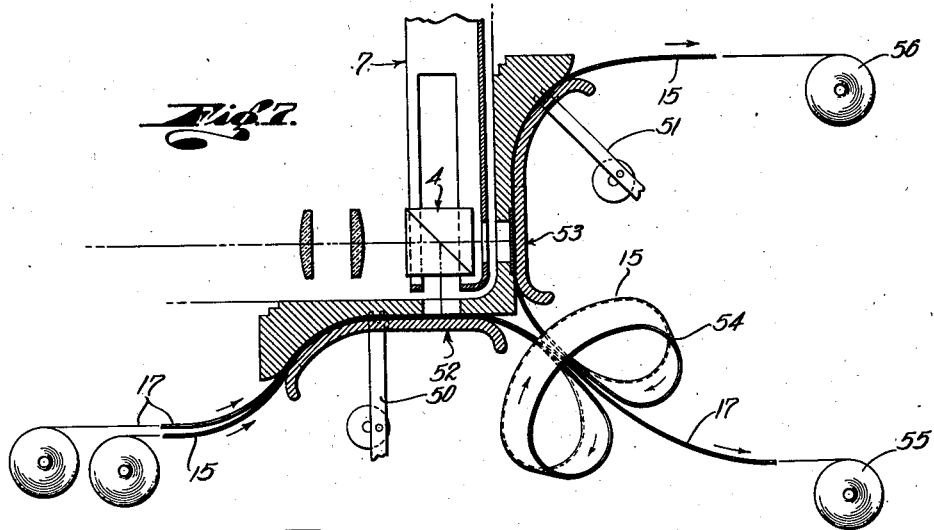
Fig. 7 is a schematic vertical sectional view of a camera embodying a modification of the method of Fig. 1.

In the modified camera and method shown in Fig. 7, arrangements are made for photographing the green record in the direct beam from the prism 4, while the red and blue records are photographed in the reflected beam. Fig. 7 illustrates one of several ways which might be used to accomplish this. In Fig. 7, the pull-down mechanisms 50 and 51, together with certain sprockets not shown, traverse the films in the opposite direction to that shown in Fig. 1, namely in a clockwise direction, with the horizontal gate 52 employed as a bi-pack gate, and the vertical gate 53 employed as a gate for the film 15. After the blue and red records are formed on the bi-pack by the reflected beam at the gate 52, the films 15 and 17 are separated by loop 54, like loop 25, 26 of Fig. 1, the film 17 passing to a take-up reel 55, while the film 15 traverses the gate 53 in order to receive the green record, and then to take-up reel 56. Otherwise, the construction and operation of the method and apparatus of Fig. 7 is substantially the same as that above described in connection with Fig. 1.

After the films 15 and 17 are developed, by means of a step printer the blue records on film 17 are printed in succession on the successive frames of a positive film. The red records 29 appearing on alternate frames of film 15 are likewise printed on successive frames of another positive film, and similarly for the green records 30 which are printed on successive frames of a third positive film.

A release print is prepared as follows. The three positive films after being developed, are schematically represented in section in Fig. 8 by the reference numbers 31, 32, 33. Behind each of these films is arranged a light source 34, 35, 36 respectively, and between each such light source and its film is arranged a filter 37, 38, 39, respectively, the filters being of such a color that the light projected through its respective film is substantially the same as the color of the light which exposed the corresponding negative. The colors recorded on the negative films 15 and 17 may be mutually exclusive or they may overlap as is well-known. In any event, both the intensity and the color thus recorded in the camera may be compensated to some extent by suitably selecting the intensity of the lights 34 to 36, and by suitably selecting the colors of the filters 31 to 33. The three-colored beams thus produced may be projected along parallel axes to a V shaped semi-transparent mirror 43, where the three beams are combined on a common axis 44 and employed to expose suitable positive stock indicated at 42, such as Kodachrome. The positive 42 which may be employed as a release print for operation in a standard motion picture projector thus bears, in natural colors, a transparent image of the object photographed.

The cameras of Figs. 1 and 7 may have suitable register pins, not shown.

In the modified printer of Fig. 9, use may be made of positive stock 45 having emulsion on opposite sides thereof in which case the printing lamp 46 for one of the positives may be arranged on one side of the film 45 with the other two lamps 47, 48 on the other side, the film 45 being suitably traversed with the positives so as to print each set of three-color records on the superposed frame portions of film 45. Otherwise the operation and arrangement is the same as described in connection with Fig. 8.

If desired, as shown in Figs. 10 and 11, I may employ a filter 57 in the aperture 12 of shutter 7 and this filter 57 may be employed to change the relationship of exposure of the pan film 15 to the ortho 17. For example, if it is desired to have less exposure on the pan film 15, this filter 57 would be minus red in whatever degree it is desired to reduce the red register, whereas if it is desired to have less exposure on the ortho film 17, this filter would be minus blue in a degree necessary to reduce the exposure on the blue record. Or the filter 57 may be mounted in the film gate 2. By mounting it in the aperture 12 however, this filter may extend only part of the length of aperture 12 as shown in Fig. 10, and its effectiveness can be varied by selecting the length of aperture 12 it will cover. Also, the filter 22 may if desired, be mounted in the aperture 14 of the shutter 7, as indicated by filter 58, to cover a desired portion of the length of this aperture 14.

Filter 57 may be held in position over aperture 12 by means of clamping strips 61 secured to shutter 7 by screws 62. Similar clamping strips 59 and screws 60 may be provided for securing filter 58 inside of rim 13 and over aperture 14.

If for any reason it is desired to modify the normal ratio of the three colors to each other for dramatic effects, the color transmission and absorption of the filters 57 and 58 described above may be modified as desired.

Various other modifications may be made in the invention without departing from the spirit of the following claims.

I claim:
1. The method of three-color photography which comprises dividing light rays into a direct beam and a reflected beam, forming two-color records by impressing one of said beams on front and back films in bi-pack relation, said bi-pack films having their emulsions face to face, traversing said bi-pack two frames at a time, forming a loop in the rear film of said bi-pack to position its emulsion out, with said rear film at the front of and with the leading edge thereof extending in the opposite direction to the front film of said bi-pack, and forming the third color record by impressing said other beam on the emulsion side of said leading edge in alternate frames but on the same track as the existing color record thereon.

2. The method according to claim 1 wherein said color record on the front film of said bi-pack is blue, and the color records on said other film are red and green in alternate frames.

BYRON C. HASKIN.